United States Patent [19]
Bobier et al.

[11] Patent Number: 5,089,764
[45] Date of Patent: Feb. 18, 1992

[54] SOLAR PANEL DRIVEN AIR PURGING APPARATUS FOR MOTOR VEHICLES

[75] Inventors: Joseph A. Bobier, St. Mary's; Gerald E. Brown, Parkersburg, both of W. Va.

[73] Assignee: Bobier Electronics, Inc., Parkersburg, W. Va.

[21] Appl. No.: 471,537

[22] Filed: Jan. 29, 1990

[51] Int. Cl.⁵ .................................. G05F 1/56
[52] U.S. Cl. ...................... 320/20; 323/282; 323/906
[58] Field of Search ............ 320/2, 20, 21; 323/282, 323/284; 2/906; 62/236, 310; 136/291; 98/2.11; 236/49.3

[56] References Cited

U.S. PATENT DOCUMENTS

| | | | |
|---|---|---|---|
| 2,970,456 | 2/1961 | Rice | 62/310 |
| 3,943,726 | 3/1976 | Miller | 62/236 X |
| 4,017,745 | 4/1977 | McMahon | 323/282 X |
| 4,027,228 | 5/1977 | Collins | 323/282 |
| 4,563,628 | 1/1986 | Tietz et al. | 320/20 |
| 4,658,597 | 4/1987 | Shum | 98/2.11 X |
| 4,661,758 | 4/1987 | Whittaker | 323/906 X |
| 4,804,140 | 2/1989 | Cantrell | 236/49.3 |
| 4,847,546 | 7/1989 | Bobier et al. | 320/21 |
| 4,862,056 | 8/1989 | Goto et al. | 323/284 X |
| 4,873,480 | 10/1989 | Lafferty | 323/906 X |
| 4,916,382 | 4/1990 | Kent | 323/906 X |

Primary Examiner—Steven L. Stephan
Assistant Examiner—Kristine Peckman
Attorney, Agent, or Firm—Mueller and Smith

[57] ABSTRACT

Apparatus and system for purging hot air from the cabin of vehicles when parked under hot sun conditions. The system employs a solar panel of relatively smaller size suited for incorporation with a sun roof or rear window of the vehicle. A power transfer regulator is utilized which is responsive to the peak voltage chacteristic of the solar panel to cause the panel to substantially continuously to perform at its peak power output capability. As such, an equivalent power at lower voltage and enhanced current levels is submitted to the electric drive motor of an air purging fan within the vehicle. Switching controls are provided which monitor the state of the vehicle's internal combustion engine through its ignition switch and which provide turn-on of the purging system at such time as vehicle cabin temperatures reach predetermined levels. When the air circulation system is disabled, the solar panel is employed for charging the battery of the vehicle.

19 Claims, 3 Drawing Sheets

SOLAR PANEL DRIVEN AIR PURGING APPARATUS FOR MOTOR VEHICLES

BACKGROUND OF THE INVENTION

When automobiles are parked under typical conditions the contents therein are secured by locking all doors and closing all windows. Where this procedure takes place under warm summer or tropical environments, the cabins of such vehicles undergo a substantial heat build-up. While parked under generally encountered summer conditions, cabin temperatures in secured automobiles can rise to the 140° F. to 150° F. regions. In addition to the familiar discomfort experienced by the automobile owner in entering an automobile under such high temperature cabin conditions, high cabin heat can damage goods retained in the automobile. Life threatening situations can arise where children or pets are inadvertently subjected to cabin heat build-up.

Operation of a purging fan or blower of the cabin environmental control system initially occurs to those considering this problem. However, when the automobile is parked, its prime power source, the internal combustion engine, is off and the only remaining source of power for the vehicle is its battery. That battery source is inadequate for the air purging work output required to ameliorate the condition of high cabin heat.

The precedent cause of cabin heat build-up being sun sourced radiation, it has occurred to investigators to employ solar panels as a power source for an air purging fan. However, the power performance characteristics of solar panels is such that they will not accommodate blower motor demands, particularly at start-up, while remaining of a radiation intercepting area size sufficiently small for practical automotive applications. In effect, the output impedance of the solar panel will be much higher than the input impedance of the air purging blower, a condition traditionally accommodated for by use of solar panels of relatively larger area extent.

SUMMARY

The present invention is addressed an apparatus and system for providing air circulation or purging within the cabin of a motor vehicle utilizing a solar panel of practical size to power an electric motor driven fan. Such practical size, for example, may be represented by the incorporation of the solar panel with a sunroof or rear window of an automobile. To achieve adequate fan motor driving performance from solar panels of such limited size, a power transfer regulator is employed which responds to solar panel voltage to maintain peak power performance while deriving an equivalent power input to the fan driving electric motor. Thus, motor performance is achieved which otherwise would not be available through a direct coupling of the solar panel energy source with the motor.

Inasmuch as the effectiveness of the system is present when the vehicle's prime power supply, an internal combustion engine, is off, the state of its ignition switch is monitored with the system to provide enabling and disabling inputs which provide one aspect of fan control. By combining this engine monitoring feature with a control switch such as a cabin temperature responsive device or thermostat, the system may be automatically activated when the vehicle with which it is associated is parked under sunny conditions. When vehicle cabin temperatures are sufficiently low and a monitoring thermostat or the like is in an open circuit condition, then the output of the solar panel ideally may be utilized to charge the battery of the parked vehicle. This feature of the system is of particular value where the vehicle is located in climates having cold winter seasons. During such cold weather, typical batteries are under stress due to cold temperatures and a charging feature is quite valuable. Because solar panels characteristically will reach peak voltages quite rapidly even under the lower light conditions of winter, an ideal battery charging relationship will develop to improve battery operation under otherwise stressful weather conditions. With the instant system, such a selective battery charging feature is achieved through the simple expedient of employing a diode or the like within the control circuit.

Another feature of the invention provides, in a motor vehicle having an enclosable cabin, an internal combustion engine, a battery, an ignition switch having an on position for enabling the internal combustion engine and an off position, and an electric motor coupled in driving relationship with an air circulating fan for circulating air through said cabin, the air circulating drive apparatus which comprises a solar panel mounted in connection with the vehicle having a panel output exhibiting variable voltage levels including a peak voltage level and substantially constant current. A power transfer regulator is provided for transferring power from the panel to the electric motor when enabled and includes an energy storage device connectable across the panel output and chargeable by the current therefrom to variable charge levels. A solid-state switch is connected in energy transfer relationship with the energy storage device and is actuable between conducting and non-conducting states when the power transfer regulator is enabled. An inductor is connected with the solid-state switch and is connectable with the electric motor for conveying current thereto from the panel and the energy storage device when the solid-state switch is in its conducting state. A unidirectional conductor is connectable with the electric motor for conveying current thereto from the inductor when the solid-state switch is in its non-conducting state. A solid-state switch control network is provided having a first reference network responsive to the panel output voltage levels for providing a first reference output and a second reference network is provided having a second reference output substantially corresponding with a select solar panel peak voltage level and further includes a level responsive arrangement responsive to the first and second reference outputs for actuating the solid-state switch to provide effective power transfer to the electric motor. The apparatus further includes a control switching arrangement for selectively enabling the power transfer regulator.

Another feature of the invention provides a system for removing hot air from the cabin of a parked vehicle of a variety having an internal combustion engine and an ignition switch coupled with a battery of given voltage rating and having an off position deactivating the engine and an on position activating the engine. The system includes a fan drivable to direct hot air from the vehicle cabin and an electric motor which is energizable to drive the fan. A solar panel is mounted upon the vehicle having a panel output exhibiting, as an output characteristic, variable voltage levels including a peak voltage level above the battery given voltage rating and substantially constant current value. A power transfer regulator is provided which is mounted upon the vehicle and which has an input coupled with the panel output and an output coupled with the electric motor. The power transfer regulator is responsive to the solar panel voltage levels for maintaining the panel voltage substantially at its peak voltage to develop peak effective power therefrom and, when enabled, provides substantially equivalent power at the output at voltage values lower than the peak value and current values higher than the constant value. Control switching is provided for enabling the power transfer regulator when the ignition switch is in an off position.

Other objects of the invention will, in part, be obvious and will, in part, appear hereinafter. The invention, accordingly, comprises the apparatus and system possessing the construction, combination of elements, and arrangement of parts which are exemplified in the following detailed description.

For a fuller understanding of the nature and objects of the invention, reference should be had to the following detailed description taken in connection with the accompanying drawings.

DETAILED DESCRIPTION OF THE INVENTION

Figure 1:
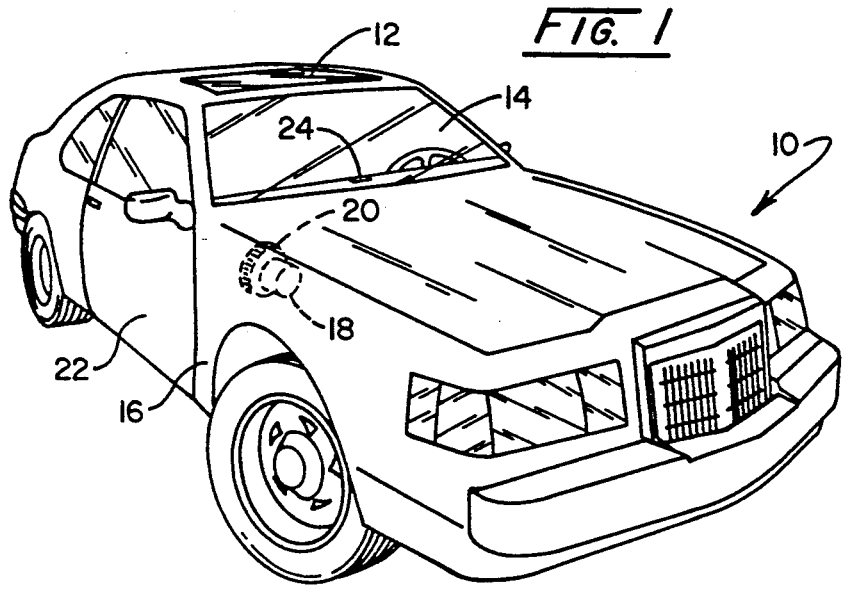
FIG. 1 is a perspective view of a motor vehicle incorporating the air circulating features of the invention.

The air purging or air circulating apparatus of the invention may employ a relatively smaller solar panel for the purpose of powering a relatively larger blower motor as used for circulating air in an automobile. When used in the latter application, as opposed to use in vans, buses, or the like, the solar panel is dimensioned so as to conform with a complementary component of the vehicle. For example, for the automobile implementation shown in FIG. 1 in general at 10, the solar panel may be employed as a component of a sunroof 12. Sunroof 12 is seen positioned above the cabin 14 of the vehicle 10. The solar panels themselves are formed of thin film materials permitting them to be substantially transparent, thus not impeding the desired transparency of sunroofs as at 12. Alternately, the panels may be incorporated, for example, with a rear window or the like of vehicle 10. In typical fashion, such vehicles as at 10 will include a chassis or body 16 within which are located an internal combustion engine, a battery for supplying lesser amounts of energy in the absence of operation of the engine, an ignition switch, and one or more electric motors as shown in phantom at 18 which power an air circulating fan also revealed in phantom at 20 and which represents a portion of the environmental control system for the cabin 14. Typically such fans at 20 are of a squirrel cage variety and the electric motors which drive them are powered from associated generator components. Typically, such motors as at 18 are of a 200 watt variety. By contrast, conventional solar panel structures having a size corresponding with the size of the sunroof as at 12 will have a capacity of about 20 watts.

In the operation of the instant apparatus, when the operator of vehicle 10 parks it under sunny or warm temperature conditions, the doors as at 22 typically are locked with all windows raised and the cabin 14, thus, is secured. Inasmuch as the prime power source or internal combustion engine of vehicle 10 is off, only a battery of given voltage rating is otherwise available for powering the electric motor 18 to provide drive for fan 20. The battery employed with such vehicles as at 10 is of insufficient capacity for such purposes. However, under the arrangement of the instant invention, the power output of the relatively smaller solar panel 12 is sufficient to be employed to energize the motor 18 to drive fan 20 at a speed which, while generally lower than that provided during operation of the internal combustion engine, is sufficient to provide air circulation within cabin 14. Of course, additional motors and fan combinations may be provided of lesser power demand, however, in any instance, without more, the output of the typical solar cell configured as at 12 will be insufficient for such a task. Temperature within the cabin 14 may be monitored by a heat responsive device such as the thermostat represented at 24 located on the automobile's dashboard. As the temperature level within cabin 14 increases to a predetermined value, the thermostat 24 will activate the instant apparatus to seek reduction of temperature levels within cabin 14 to an acceptable value. Under conditions wherein the temperature level within cabin 14 is below that predetermined value, and the ignition switch of vehicle 10 remains off, then the output of the solar panel as at 12 may be employed for battery charging purposes.

Figure 2:
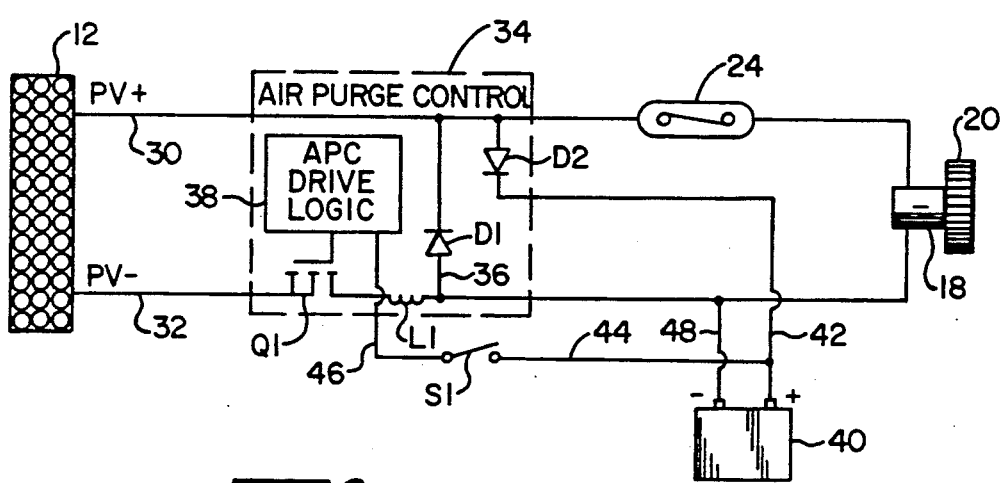
FIG. 2 is a schematic representation of the air circulating apparatus of the invention.

Referring to FIG. 2, a general schematic representation of the components functioning to provide the air circulating or purging feature within vehicle 10 are revealed. In FIG. 2, the solar panel 12 again is represented by that numeration and is seen to have two outputs at lines 30 and 32 respectively labeled "PV+" and "PV−". It is the characteristic of such solar cells as at 12 that the output at lines 30 and 32 will exhibit a constant current characteristic and exhibit a peak voltage which, under direct loading, will drop in consonance with the applied load. This characteristic is accommodated for in general by an air purge control represented within dashed boundary 34 which functions to maintain a peak power performance of the solar panel source 12. Such a system is described, for example, in U.S. Pat. No. 4,847,546 by Bobier, et al., issued July 11, 1989, assigned in common herewith and incorporated herein by reference. The control 34 generally includes a solidstate switch such as field effect transistor (FET) Q1 incorporated within line 32, an inductor L1 incorporated in that line, and a freewheeling diode D1 positioned within line 36 between lines 30 and 32. Control over the conduction or switching of FET Q1 is by a gate input thereto from an air purge control (APC) drive logic represented at block 38. This drive logic 38 monitors the status of the ignition switch S1 of the vehicle 10 by responding, for example, to the imposition initially of current from the battery of vehicle 10 coursing therethrough when switch S1 is closed. The battery associated with vehicle 10 is represented in FIG. 2 at 40 having a plus output coupled via lines 42 and 44 to switch S1, which, in turn, is seen coupled to the drive logic block 38 via line 46. Line 42 additionally is seen coupled through a steering diode D2 to line 30. The negative terminal of battery 40 is seen coupled to line 32 via line 48.

Line 32 is seen directed to one side of an electric motor again represented at 18 which, in turn, functions to drive the earlier-noted fan 20, here represented at a typical squirrel cage fan. Oppositely disposed line 30 is seen directed through a thermostat form of switch as earlier described at 24 to the opposite input to electric motor 18. With the arrangement shown, the drive logic 38 will monitor the status of ignition switch S1 and, when that switch is in an open position, will function to monitor the voltage levels of panel 12 and cause its operation at a peak power output. In effect, the regulator contained air purge control provides a current step-up in correspondence with any dropping of voltage to maintain an equivalent power transfer based upon a peak operating condition of panel 12. Assuming adequate sun conditions and temperature build-up within the cabin 14 of vehicle 10, the thermostatic switch 24 will close at a predesignated temperature level and the resultant output at lines 30 and 32 will be utilized to energize electric motor 18 to drive fan 20. Where this is effective to sufficiently reduce the temperature of the cabin 14 of vehicle 10 to a point below the threshold level for thermostat 24, and ignition switch S1 remains open, then the apparatus will function to charge battery 40 through diode D2. However, upon any closure of switch S1, the apparatus is disabled, the prime power source or internal combustion engine of the vehicle 10 providing all power for environmental control and recharging battery 40. The battery charging feature of the apparatus and system including use of diode D2 provides an ideal enhancement for the vehicular mounting contemplated. In general, the voltage rating of the solar panel utilized will be higher than the given voltage rating of the battery employed within the automobile. It is the characteristic of such solar panels to develop full output voltage quite rapidly even at lower light levels such that a recharging feature is available within the system quite often as long as the air purging air circulating feature employing motor 18 is not being utilized. Under the latter conditions, the voltage will be drawn down by motor 18 such that diode D2 will block any charging activity to the battery when the thermostat switch 28 is closed. However, the thermostat will be closed for the most part during summer months and during that season of warmth, typical vehicular batteries tend to perform at optimized levels. In winter, however, under cold weather conditions, the batteries tend to require an an enhanced charging maintenance. It is during this season that the thermostat 24 generally will be in an open circuit condition and the solar panel powering system will function ideally to provide battery charging maintenance during such cold weather conditions. This charging activity will ensue even though sun radiant energy available during the winter months may be of diminished scope as compared to summer months.

Figures 3A, 3B:
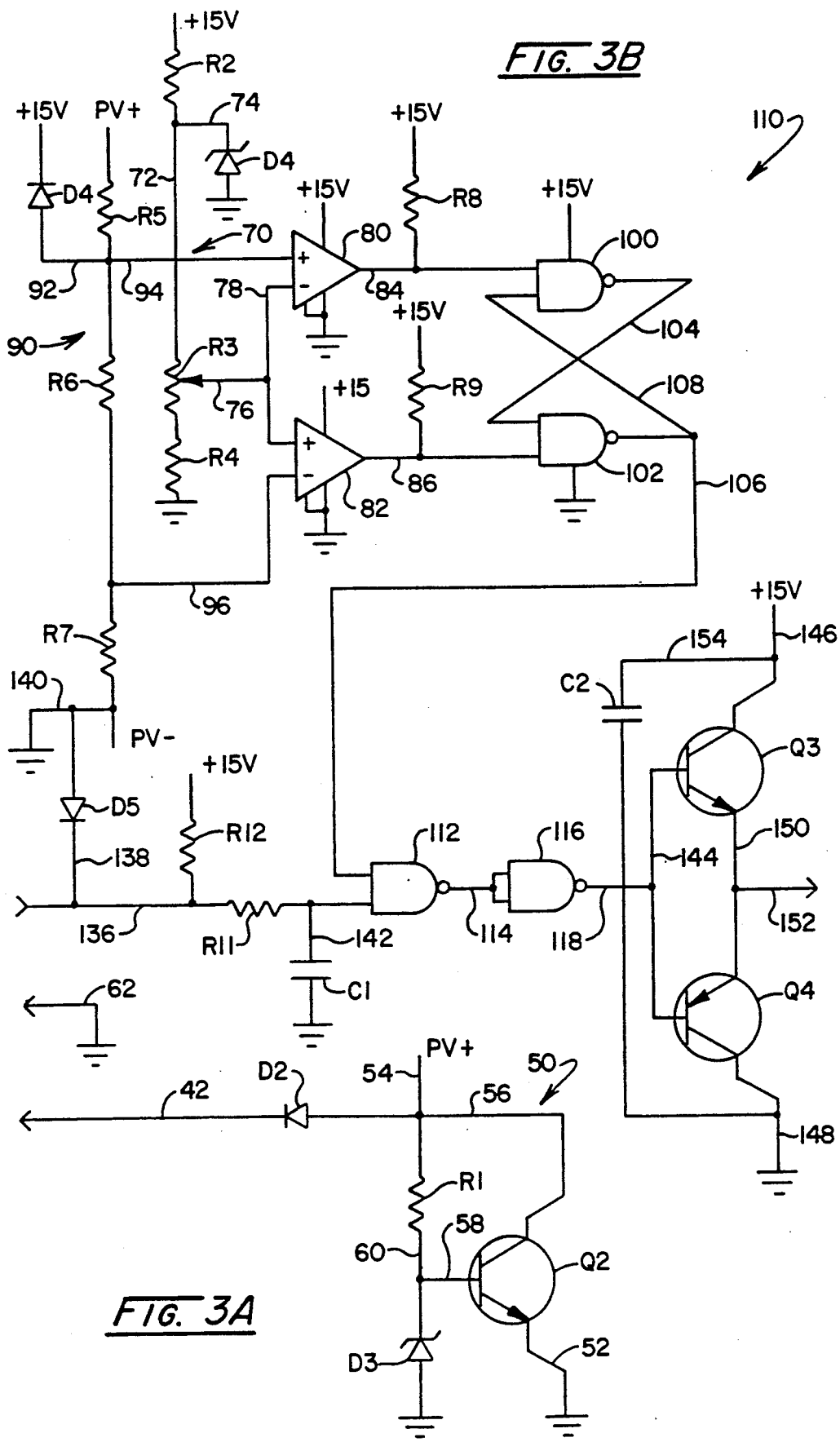
FIGS. 3A-3D are a schematic diagram of a power transfer regulator and control switching components employed with the air circulating apparatus of the invention.

Looking to FIG. 3A, the initial component of the circuit providing power transfer regulation and control is a power supply regulator represented generally at 50. Regulator 50 responds to the varying voltage levels of solar panels as at 12 and develops, for example, a 15 v supply for the remaining circuitry. In this regard, the network 50 includes an NPN transistor Q2 having its emitter coupled to ground via line 52, and its collector coupled to the panel output PV+ as represented at lines 54 and 56. The base of transistor Q2 is coupled via line 58 to line 60 at a location intermediate Zener diode D3 and resistor R1. Line 60, in turn, is coupled between PV+ line 56 and ground. Thus, a power supply, for example at 15 v is developed for the circuitry. This value is developed by Zener diode D3 and current to the base of transistor Q2 is limited by resistor R1. FIG. 3A also shows battery charging line 42 incorporating diode D2 as well as the input to the battery 40 negative terminal as represented at line 62.

Referring to FIG. 3B, the power supply as represented as +15 v is seen applied to a reference network represented generally at 70 and including a line 72 coupled between +15 v and ground and incorporating resistors R2, R3, and R4. A Zener diode D4 coupled within line 74 between ground and line 72 combines with resistors R2-R4 to derive a stable reference which is tapped at variable resistor R3 by wiper arm 76. Resistor R4 functions to provide a range limit for the reference voltage developed at wiper arm 76. This reference is employed for purposes of electing an appropriate peak operating point for the solar panel 12. Wiper arm 76 is seen coupled via line 78 to the respective negative terminal and positive terminal input of comparators 80 and 82. Comparators 80 and 82 may be provided, for example, as type LM311N and provide outputs, respectively, at lines 84 and 86.

The voltage output of the associated solar panel as at 12 is monitored by a panel reference network represented generally at 90 and seen coupled between PV+ and PV− as earlier represented at respective lines 30 and 32. Network 90 incorporates resistors R5-R7 and is seen additionally coupled via line 92 and diode D5 to regulated power supply +15 v. Diode D5 functions to protect the input to comparator 80 from over-voltages, for example, should the input monitor develop a voltage level above the regulated supply it is essentially retained at that supply value as an upper level. Network 90 is seen coupled to the positive terminal of comparator 80 via line 94, while, correspondingly, the negative terminal of comparator 82 is coupled to network 90 via line 96. With the arrangement shown, as the value of voltage at network 90, representing a percentage of instantaneous panel voltage, exceeds the reference value at line 78, the output of comparator 80 at line 84 develops a logic high signal value. Note that line 84 is coupled through pull-up resistor R8 to +15 v regulated supply. Conversely, as the value of voltage as monitored by network 90 diminishes below the value of reference voltage at line 78, the output of comparator 82 at line 86 assumes a logic high value. As before, line 86 is coupled through pull-up resistor R9 to regulated +15 v supply. Resistor R6 is incorporated within network 90 to provide a small offset in the voltage asserted to comparators 80 and 82 to assure that they will not develop a simultaneous logic high output.

The output at line 84 of comparator 80 is directed to one input of NAND gate 100. Correspondingly, the output of comparator 82 at line 86 is directed to one input of NAND gate 102. The output of gate 100 is coupled via line 104 to the opposite input of gate 102, while the output of gate 102 at lines 106 and 108 is coupled to the input of gate 100. Thus interconnected, gates 100 and 102 form a cross-coupled flip-flop or monostable multivibrator represented generally at 110, for example, having a set input at line 84 and a reset input at line 86 with an output at line 106. Gates 100 and 102 may be provided, for example, as type MC14011. In operation, as line 84 assumes a logic high value, the output of gate 100 at line 104 assumes a logic low which is directed to one input of gate 102. Inasmuch as line 86 will be at a logic low, the output of gate 102 at line 106 assumes a logic high value. Correspondingly, as the logic levels at output lines 84 and 86 convert to an opposite configuration, then the output at line 106 reverts to a logic low value. Line 106 is seen directed to one input of a NAND gate 112 having an output at line 114 which is coupled in parallel with both inputs of a corresponding NAND gate 116. Gates 112 and 116 may be provided as the same type of device as gates 100 and 102 and provide an output at line 118. These gates 112 and 116 form a component of a control switching arrangement which functions to enable the power transfer regulator components in correspondence with the position of the ignition switch S1.

Figure 3C:
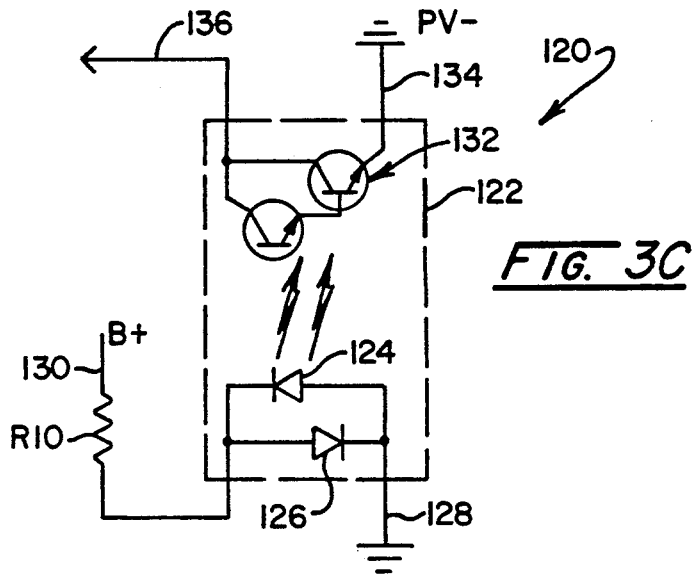

Turning momentarily to FIG. 3C, this enablement input to gate pair 112 and 116 is represented at the ignition switch monitoring arrangement shown in general at 120. Arrangement 120 includes an opto-isolator represented within dashed boundary 122 which may be provided, for example, as a type NEC 2506 and which includes cross coupled photodiodes 124 and 126 connected between ground at line 128 and to the battery 40 through ignition switch S1 via line 130 which is seen to incorporate limiting resistor R10. Thus, when ignition switch S1 is closed, initially, battery power is applied to the diode pair 124 and 126 to effect the illumination of one thereof. This illumination functions to turn on a Darlington coupled phototransistor pair 132, the emitter output of which is coupled to PV— or ground via line 134 and the commonly coupled collectors thereof are connected to line 136. Returning to FIG. 3B, line 136 is seen to extend through resistor R11 to the opposite input of NAND gate 112. Line 136 additionally is coupled to +15 v regulated supply through pull-up resistor R12 and is protected from over-voltage by a diode D6 coupled within line 138 between line 136 and PV— or ground at line 140. A capacitor C1 within line 142 coupled between line 136 and ground functions as a filter.

With this enabling approach, when the ignition switch S1 is not closed and network 120 is inactive, the input to gate 112 at line 136 will be at a logic high value by virtue of its connection with regulated source through resistors R11 and R12. Thus, with the assertion of a logic high value at line 106 due to a positive going or logic high value at line 84 from comparator 80, such signals will be transmitted through the gate pair 112 and 116 as a logic high value at line 118. Conversely, when ignition switch S1 is in an on position and Darlington transistor pair 132 are on or active, then line 136 is held to a logic low level and the output at line 118 of gate pair 112 and 116 is retained at a disabling logic low value.

The output of gate pair 112 and 116 at line 118 functions to develop a gating signal for selectively actuating MOSFET Q1 (FIG. 2).

Output line 118 is coupled via line 144 to the base of NPN transistor Q3 and the base of PNP transistor Q4. The collector of transistor Q3 is coupled via line 146 to regulated +V source, while the collector of transistor Q4 is coupled to ground via line 148. The emitters of transistors Q3 and Q4 are commonly coupled by line 150 which, in turn, is connected to a gating signal line 152. Transistors Q3 and Q4 are connected as an emitter-follower pair and form a totem pole output at lines 150 and 152. Thus, with a logic high or on gating input at line 118, transistor Q3 is turned on and transistor Q4 is turned off to assert +15 v from line 146 to gating signal line 152. A capacitor C2 within line 154 extending between the collectors of transistors Q3 and Q4 provides a surge current for accentuating the passage of current through transistor Q3 to provide the noted gating signal at line 152. Conversely, with the assertion of a logic low signal or value at line 118, transistor Q4 is turned on to couple lines 150 and 152 to ground, while transistor Q3 is turned off.

Figure 3D:
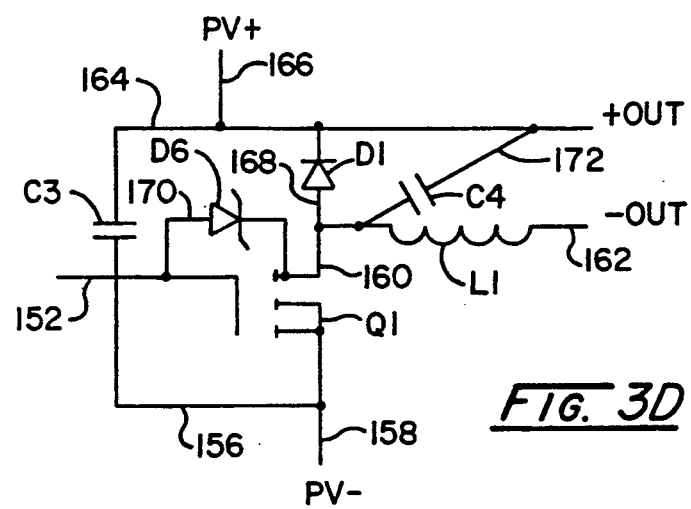

Looking additionally to FIG. 3D, gating signal line 152 is seen directed to the gate of MOSFET transistor Q1 which may be provided, for example, as a type IRFZ32. The source terminal of transistor Q1 is coupled with line 156 which extends to one side of an energy storage capacitor C3. Line 156 additionally is coupled to the PV— side of solar panel 12 as represented at line 158. The drain terminal of transistor Q1 extends via line 160 and inductor L1 to a negative output (—OUT) at 162 which is coupled or connectable with one side of motor 18 in the manner of line 32 as described in conjunction with FIG. 2. The opposite side of storage capacitor C3 is coupled to the positive terminal of panel 12 as represented at lines 164 and 166. Additionally, it may be observed that a free-wheeling diode D1 extends within line 168 between lines 160 and 164. Line 164 extends to the opposite side of electric motor 18 and corresponds with line 30 as represented in FIG. 2.

A Zener diode D7 is coupled within line 170 between the drain and gate electrodes of transistor Q1 to assure that the level of voltage at the gate coupled to line 152 cannot rise above a predetermined level, for example 18 volts. Additionally, an RF energy suppression capacitor as at C4 within line 172 optionally may be employed at the desire of the designer.

In operation, when the voltage level at the solar panel exceeds the reference level at input 78 to comparator 80 (FIG. 3B) and assuming appropriate enablement of the power transfer regulator components, then capacitor C3 will have followed such voltage build-up at the panel and will be charged to store energy. The resultant gating of transistor Q1 from line 152 will cause conduction across the source and drain terminals of transistor Q1 with the result that inductor L1 will be charged or excited, and as this occurs, the voltage level at capacitor C3, now discharging, will diminish. The current passes to the motor 18. When the level at panel 12 diminishes as well as the voltage across capacitor C3, then comparator 82 will cause the removal of the gate signal at line 152. As a consequence, inductor L1 discharges to charge the load or motor 18 through free-wheeling diode D1. As this occurs, storage capacitor C3 commences to charge to repeat the cycling. Thus, by appropriate adjustment of wiper arm 76 with respect to resistor R3, the solar panel will be caused to operate at a peak power condition of its characteristic output.

Since certain changes may be made in the above apparatus and system without departing from the scope of the invention herein involved, it is intended that all matter contained in the above description or shown in the accompanying drawing shall be interpreted as illustrative and not in a limiting sense.

We claim:

1. In a motor vehicle having an enclosable cabin, an internal combustion engine, a battery, an ignition switch having an on position for enabling said internal combustion engine and an off position, an electric motor coupled in driving relationship with an air circulating fan for circulating air through said cabin, the improvement wherein an air circulating drive apparatus is coupled with said electric motor, the air circulating drive apparatus, comprising:

a solar panel mounted upon said vehicle having a panel output exhibiting variable voltage levels including a peak voltage level and substantially constant current;

a power transfer regulator for transferring power from said panel to said motor when enabled, including:

energy storage means connectable across said panel output and chargeable by said current to variable charge levels, solid-state switch means connected in energy transfer relationship with said energy storage means and actuable between conducting and non-conducting states when said power transfer regulator is enabled, inductor means connected with said solid-state switch means and connectable with said electric motor for conveying current thereto from said panel and said energy storage means when said solid-state switch means is in said conducting state, unidirectional conducting means connectable with said electric motor for conveying current thereto from said inductor means when said solid-state switch means is in said non-conducting state, and solid-state switch control network means having a first reference network responsive to said panel output voltage level for providing a first reference output, a second reference network having a second reference output substantially corresponding with said solar panel peak voltage level, and level responsive means responsive to said first and second reference outputs for actuating said solid-state switch means to provide effective power transfer to said electric motor; and control switching means for selectively enabling said power transfer regulator.

2. The apparatus of claim 1 in which said control switching means includes a thermostat responsive to the level of temperature within said vehicle cabin for enabling said power transfer regulator when said temperature level is above a predetermined value.

3. The apparatus of claim 2 in which said control switching means thermostat is coupled between said power transfer regulator and said electric motor.

4. The apparatus of claim 1 in which said control switching means includes:

monitoring means for enabling said power transfer regulator when said ignition switch is in said off position; and electric motor activating switch means intermediate said electric motor and said power transfer regulator having an open circuit position and a closed circuit position for providing power to said electric motor from said power transfer regulator in said closed circuit position.

5. The apparatus of claim 4 in which said control switching means includes a second unidirectional conducting means coupled between said electric motor actuating switch means and said power transfer regulator and in current charging relationship with said battery for providing charging current thereto when said ignition switch is in said off position and said electric motor activating switch means is in said open circuit position.

6. The apparatus of claim 5 in which said electric motor activating switch means is a thermostat responsive to temperature within said vehicle cabin reaching a predetermined level for deriving said closed circuit position and responsive to temperatures below said predetermined level to provide said open circuit position.

7. The apparatus of claim 4 in which:

said solid-state switch includes a gate input and is actuable by said level responsive means in response to a gate signal derived thereby; and said control switching means includes gate logic means responsive to said monitoring means and to said level responsive means for selectively conveying said gate signal to said solid-state switch.

8. The apparatus of claim 7 in which said monitoring means includes an opto-isolator responsive to the passage of current through said ignition switch when in said on position for blocking said selective conveyance of said gate signal by said gate logic means.

9. The apparatus of claim 5 in which:

said solid-state switch includes a gate input and is actuable by said level responsive means in response to a gate signal derived thereby; and said control switching means includes gate logic means responsive to said monitoring means and to said level responsive means for selectively conveying said gate signal to said solid-state switch.

10. The apparatus of claim 9 in which said monitoring means includes an opto-isolator responsive to the passage of current through said ignition switch when in said on position for blocking said selective conveyance of said gate signal by said gate logic means.

11. The apparatus of claim 10 in which said electric motor activating switch means is a thermostat responsive to temperature within said vehicle cabin reaching a predetermined level for deriving said closed circuit position and responsive to temperatures below said predetermined level to provide said open circuit position.

12. The apparatus of claim 1 in which said solar panel is configured as a sunroof mounted upon said vehicle cabin.

13. The apparatus of claim 1 in which said solar panel is configured for generating about 20 watts of power.

14. A system for removing hot air from the cabin of a parked vehicle of a variety having an internal combustion engine and an ignition switch coupled with a battery of a given voltage rating, said switch having an off position de-activating said engine and an on position activating said engine, comprising:

a fan drivable to move hot air from said vehicle cabin;

an electric motor energizable to drive said fan;

a solar panel mounted upon said vehicle, having a panel output exhibiting, as an output characteristic, variable voltage levels including a peak voltage level above said given battery voltage and substantially constant current value;

a power transfer regulator having an input coupled with said panel output and an output coupled with said electric motor, said regulator being responsive to said panel voltage levels for maintaining said panel voltage substantially at said peak voltage to develop peak effective power therefrom and providing, when enabled, substantially equivalent power at said output at voltage values lower than said peak value and current values higher than said constant value of said solar panel; and control switching means for enabling said power transfer regulator when said ignition switch is in said off position.

15. The system of claim 14 in which said solar panel is configured as a sunroof mounted upon said vehicle cabin.

16. The system of claim 14 in which said solar panel is configured for generating about 20 watts of power.

17. The system of claim 14 in which said control switching means includes:
monitoring means for enabling said power transfer regulator when said ignition switch is in said off position; and
electric motor activating switch means intermediate said electric motor and said power transfer regulator having an open circuit position and a closed circuit position for providing power to said electric motor from said power transfer regulator in said closed circuit position.

18. The apparatus of claim 17 in which said control switching means includes unidirectional conducting means coupled between said electric motor actuating switch means and said power transfer regulator and in current charging relationship with said battery providing charging current thereto when said ignition switch is in said off position and said electric motor activating switch means is in said open circuit position.

19. The apparatus of claim 18 in which said electric motor actuating switch means is a thermostat responsive to temperature within said vehicle cabin reaching a predetermined level for deriving said closed circuit position and responsive to temperatures below said predetermined level to provide said open circuit position.

* * * * *